US012629670B2

(12) United States Patent
Yednak, III et al.

(10) Patent No.: US 12,629,670 B2
(45) Date of Patent: May 19, 2026

(54) METHODS AND APPARATUS FOR A COOLED CHEMICAL CABINET

(71) Applicant: ASM IP Holding B.V., Almere (NL)

(72) Inventors: Andrew Michael Yednak, III, Phoenix, AZ (US); Joseph Guardiola, Mesa, AZ (US)

(73) Assignee: ASM IP Holding B.V., Almere (NL)

( * ) Notice: Subject to any disclaimer, the term of this patent is extended or adjusted under 35 U.S.C. 154(b) by 754 days.

(21) Appl. No.: 17/955,619

(22) Filed: Sep. 29, 2022

(65) Prior Publication Data

US 2023/0107558 A1 Apr. 6, 2023

Related U.S. Application Data

(60) Provisional application No. 63/252,051, filed on Oct. 4, 2021.

(51) Int. Cl.
*B01L 1/02* (2006.01)
*F25B 21/02* (2006.01)

(52) U.S. Cl.
CPC .............. *B01L 1/025* (2013.01); *F25B 21/02* (2013.01); *F25B 2321/0251* (2013.01)

(58) Field of Classification Search
CPC ............... B01L 1/025; B01L 2200/143; B01L 2300/1822; B01L 2300/1844; B01L 2300/1894; F25B 21/02; F25B 2321/0251
See application file for complete search history.

(56) References Cited

U.S. PATENT DOCUMENTS

| | | | | |
|---|---|---|---|---|
| 5,433,175 | A | 7/1995 | Hughes | |
| 6,724,624 | B1 | 4/2004 | Dodson | |
| 6,805,623 | B2 | 10/2004 | Robison | |
| 7,728,546 | B2 | 6/2010 | Tanaka | |
| 8,154,869 | B2 | 4/2012 | Riebel | |
| 10,291,100 | B2 | 5/2019 | Ikeda | |
| 10,617,041 | B2 | 4/2020 | Domurath | |
| 2012/0111534 | A1 | 5/2012 | Chen | |
| 2018/0274825 | A1* | 9/2018 | Choi | F25D 23/066 |
| 2020/0355714 | A1* | 11/2020 | Kawamoto | B01L 3/50825 |
| 2021/0208034 | A1* | 7/2021 | Miyazaki | G01N 35/00 |
| 2021/0315128 | A1* | 10/2021 | Lian | H05K 7/202 |

FOREIGN PATENT DOCUMENTS

| | | | | |
|---|---|---|---|---|
| CN | 108974652 A | * 12/2018 | | B65D 25/02 |
| KR | 20120019596 A | * 3/2012 | | F25D 29/006 |

OTHER PUBLICATIONS

Zhu CN108974652A English translation (Year: 2025).*
Park KR 2012-0019596 A English translation (Year: 2025).*

* cited by examiner

*Primary Examiner* — Jennifer Wecker
*Assistant Examiner* — Jonathan Bortoli
(74) *Attorney, Agent, or Firm* — Snell & Wilmer L.L.P.

(57) ABSTRACT

Methods and apparatus for a cooled chemical cabinet include a cooling duct configured to cool a heatsink coupled to a thermoelectric module (TEM). The cooling duct includes a fan configured to pull air into an inlet duct and onto the heatsink. The air pulled in by the fan absorbs the heat from the heatsink. The cooling duct further includes an exhaust duct connected to the fan and configured to expel the heated air. The exhaust duct is configured to expel the heated air outside the chemical cabinet and away from the TEM.

20 Claims, 6 Drawing Sheets

METHODS AND APPARATUS FOR A COOLED CHEMICAL CABINET

CROSS-REFERENCE TO RELATED APPLICATIONS

Figure 1:
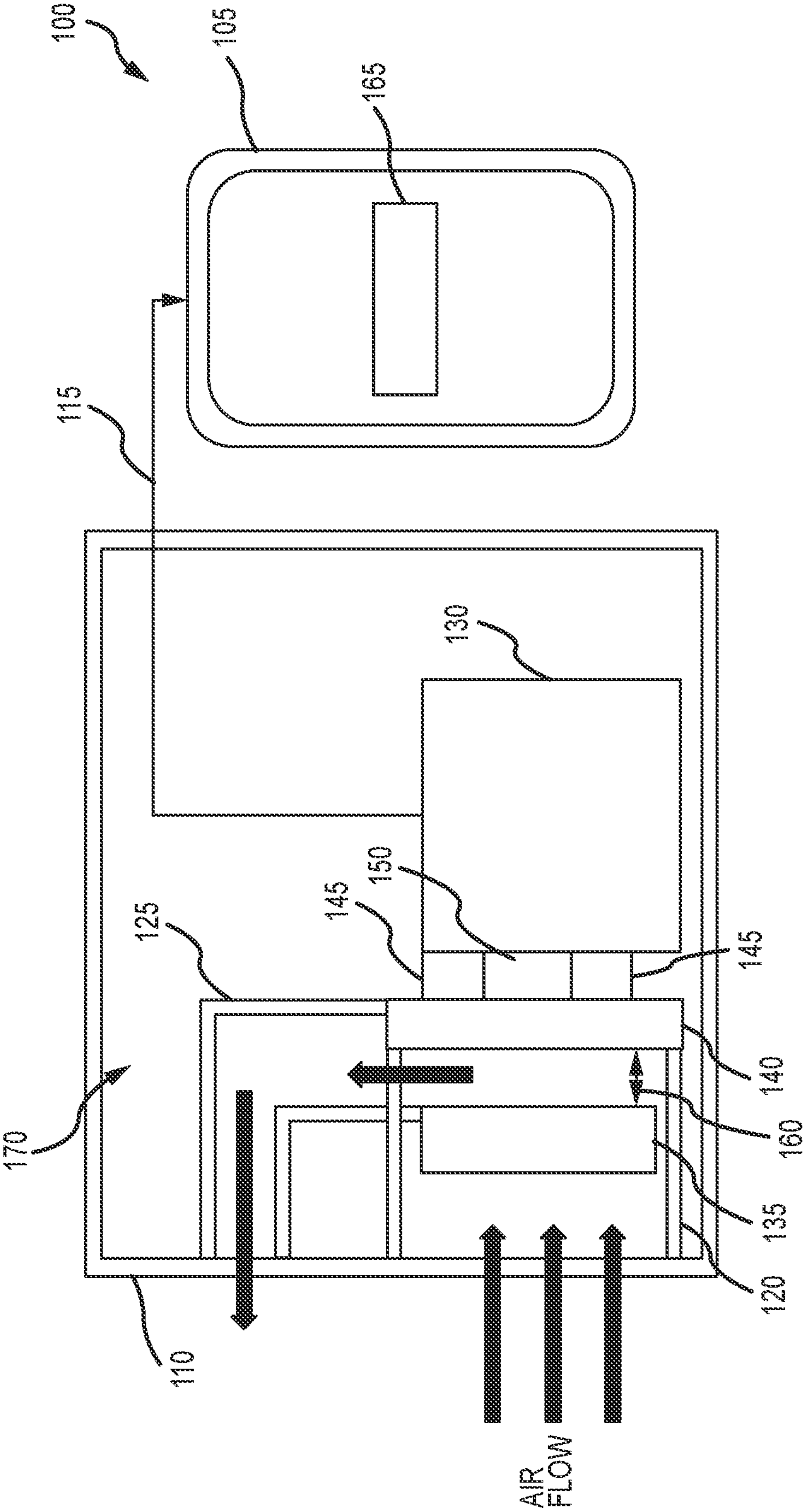

This application is a nonprovisional of, and claims priority to and the benefit of, U.S. Provisional Patent Application No. 63/252,051, filed Oct. 4, 2021 and entitled "Methods and Apparatus For A Cooled Chemical Cabinet," which is hereby incorporated by reference herein.

FIELD OF INVENTION

The present disclosure generally relates to a methods and apparatus for a cooled chemical cabinet. More particularly, the present disclosure relates to a cooled chemical cabinet used during the fabrication of semiconductor devices.

BACKGROUND OF THE TECHNOLOGY

Systems used during the semiconductor manufacturing process may be contained within one or cabinets, where one cabinet may contain a chemical and one cabinet may contain the reaction chamber. In some cases, it may be desired to cool the chemical and maintain a particular air pressure within the cabinet. Conventional systems utilize a cooling system that increases the air pressure within the cabinet and/or has an undesirable effect on the cooling capability of the cooling system. Accordingly, it may be desired to have a cooling system that provides the desired temperature to the chemical and/or cabinet while at the same time allows the cabinet to maintain a desired air pressure.

SUMMARY OF THE INVENTION

Methods and apparatus for a cooled chemical cabinet include a cooling duct configured to cool a heatsink coupled to a thermoelectric module (TEM). The cooling duct includes a fan configured to pull air into the chemical cabinet and onto the heatsink. The air pulled in by the fan absorbs the heat from the heatsink. The cooling duct further includes an exhaust duct connected to the fan and configured to expel the heated air. The exhaust duct is configured to expel the heated air outside the chemical cabinet and away from the TEM.

In one aspect, an apparatus comprises a cabinet comprising a plurality of sidewalls, a bottom plate and a top plate, wherein the plurality of sidewalls, the bottom plate, and the top plate define an interior space of the cabinet; a vessel assembly positioned within the interior space and configured to contain a liquid chemical; a thermoelectric module positioned within the interior space and abutting the vessel assembly; a heatsink abutting the thermoelectric module; and a cooling duct positioned within a first sidewall from the plurality of sidewalls and adjacent to the heatsink.

In another aspect, an apparatus comprises a cabinet comprising a plurality of sidewalls, a bottom plate and a top plate, wherein the plurality of sidewalls, the bottom plate, and the top plate define an interior space of the cabinet, wherein the interior space is configured to be held at a negative pressure; a vessel assembly positioned within the interior space and configured to contain a chemical; a thermoelectric module positioned within the interior space, and comprising a first plate abutting the vessel assembly and a second plate in parallel with the first plate; a heatsink in direct contact with the second plate; and a cooling duct at atmospheric pressure and comprising: an air duct positioned at a first opening in the first sidewall and a fan located within the air duct and positioned adjacent to and spaced apart from the heatsink; and an exhaust duct connected to the air duct and positioned adjacent to the fan and the heatsink.

In yet another aspect, a system comprises a reaction chamber; and an assembly coupled to the reaction chamber and configured to deliver a chemical to the reaction chamber, wherein the assembly comprises: a cabinet comprising a plurality of sidewalls, a bottom plate and a top plate, wherein the plurality of sidewalls, the bottom plate, and the top plate define an interior space of the cabinet; a vessel assembly positioned within the interior space and configured to contain the chemical; a heatsink positioned adjacent to the vessel assembly; a thermoelectric module disposed between the vessel assembly and the heatsink; and a cooling duct positioned within a first sidewall from the plurality of sidewalls and adjacent to the heatsink.

BRIEF DESCRIPTION OF THE DRAWING FIGURES

These and other features, aspects, and advantages of the invention disclosed herein are described below with reference to the drawings of certain embodiments, which are intended to illustrate and not to limit the invention.

Figure 2:
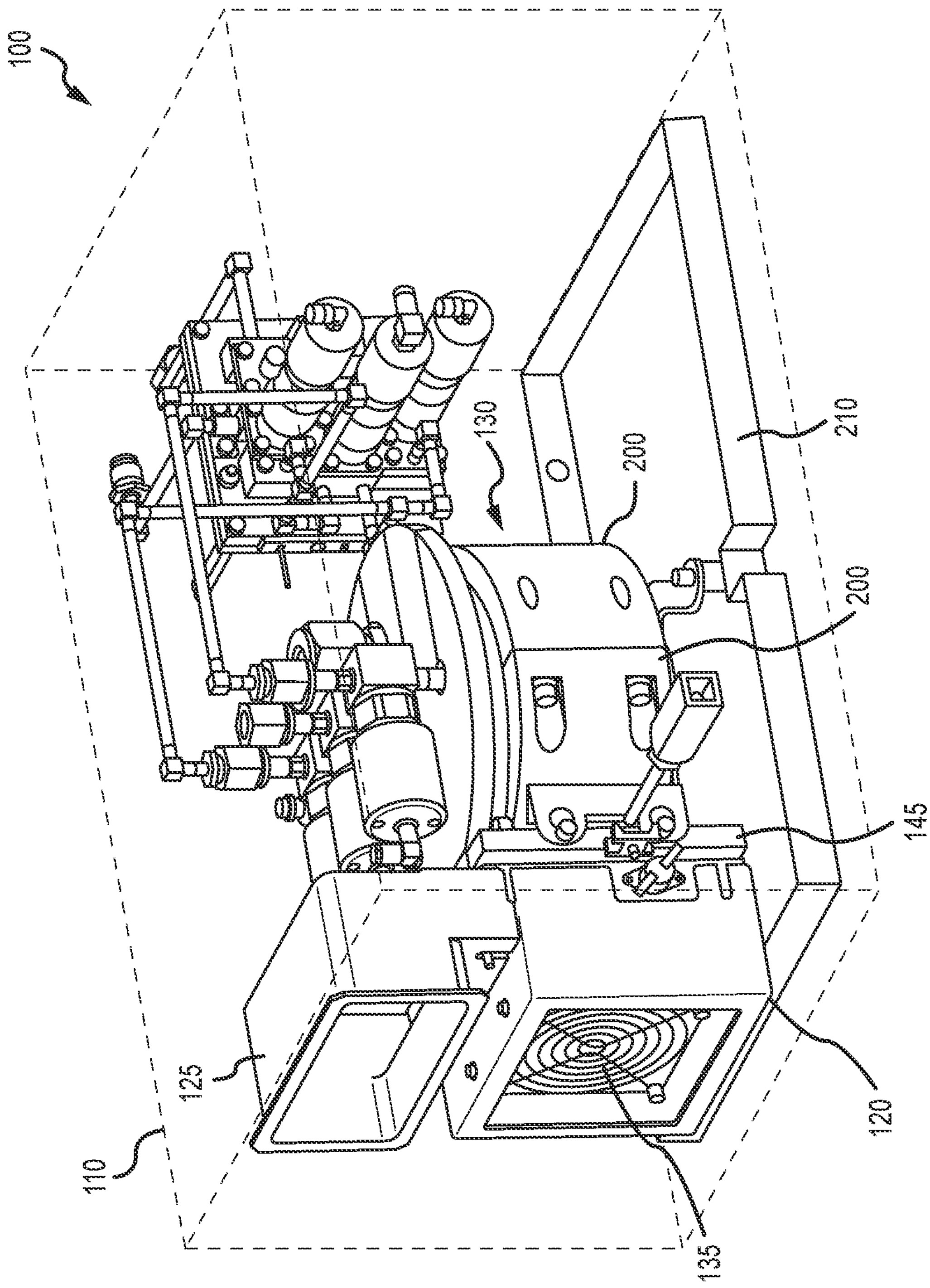
Figure 3:
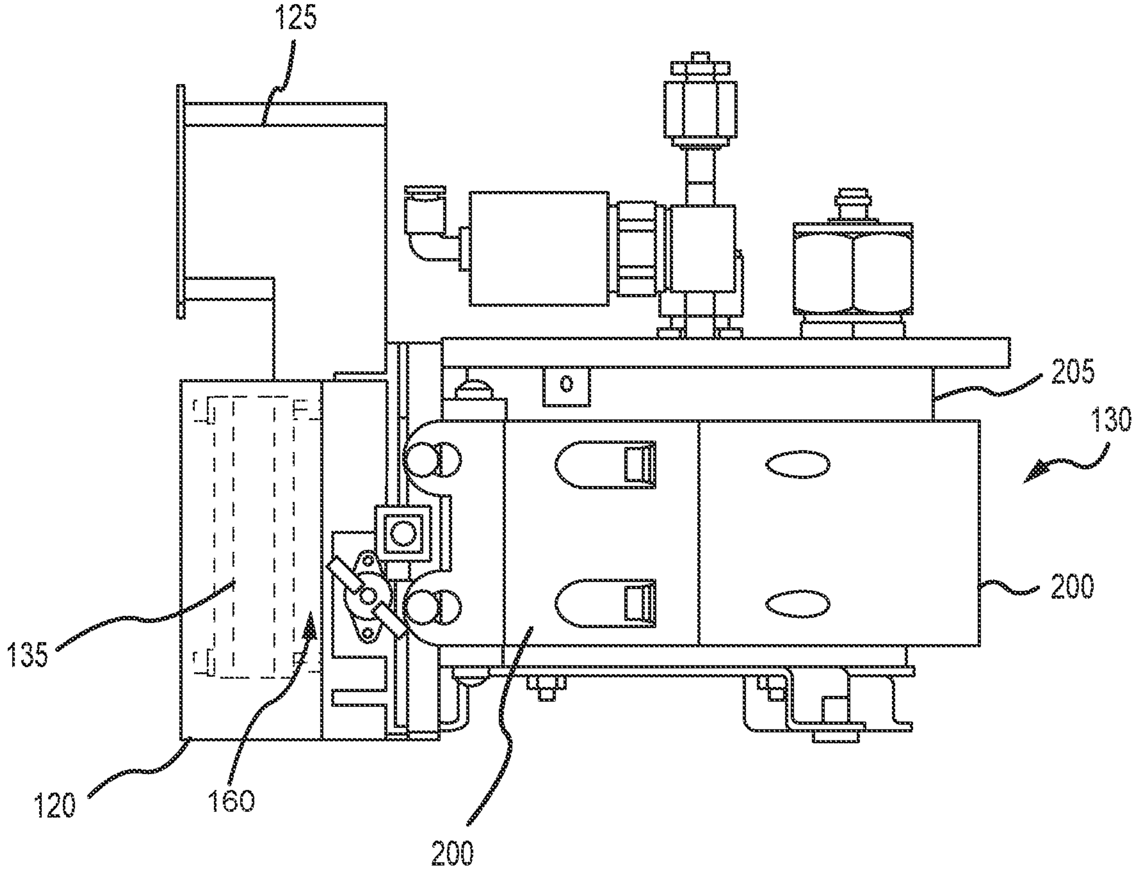
Figure 4A:
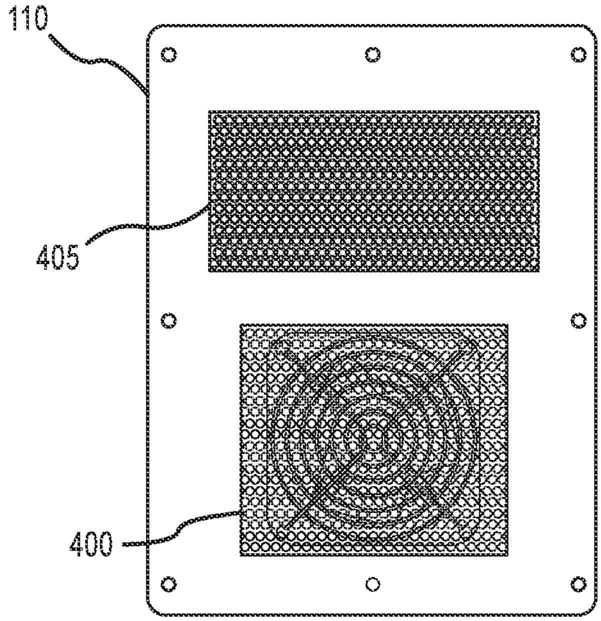
Figure 4B:
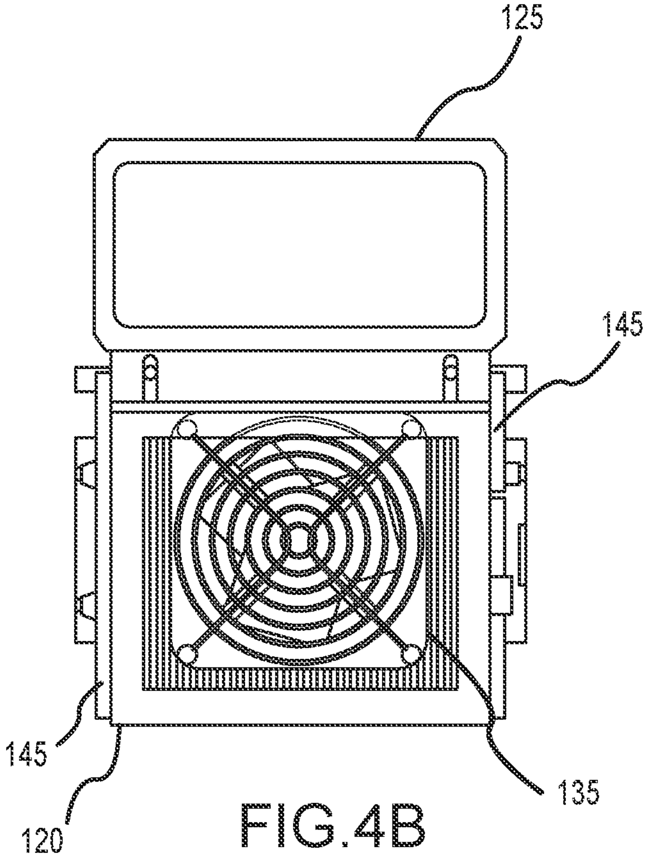
Figure 5:
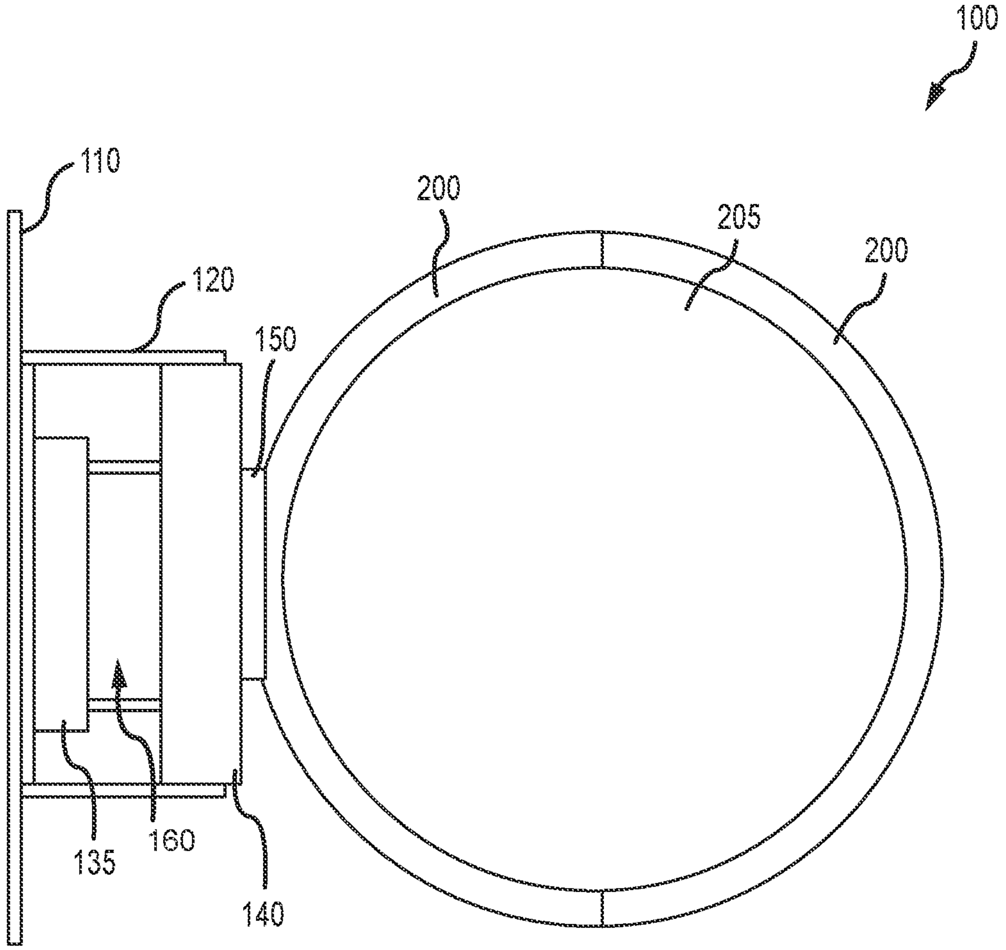
Figure 6:
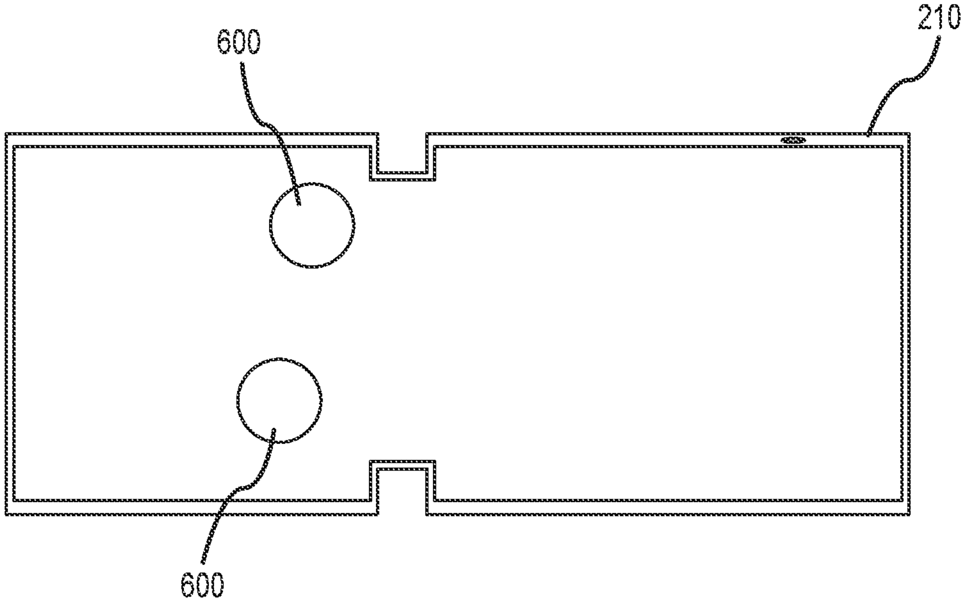

FIG. 1 representatively illustrates a system in accordance with an embodiment of the present technology;

FIG. 2 representatively illustrates interior components in a chemical cabinet in accordance with an embodiment of the present technology;

FIG. 3 representatively illustrates a side view of the interior components in a chemical cabinet in accordance with an embodiment of the present technology;

FIG. 4A representatively illustrates the front view of a chemical cabinet in accordance with an embodiment of the present technology;

FIG. 4B representatively illustrates a front view of a cooling duct in accordance with an embodiment of the present technology;

FIG. 5 representatively illustrates a top cut-away view of the cooling duct in a chemical cabinet in accordance with embodiments of the present technology; and FIG. 6 representatively illustrates a top view of a tray in accordance with embodiments of the present technology.

It will be appreciated that elements in the figures are illustrated for simplicity and clarity and have not necessarily been drawn to scale. For example, the relative size of some of the elements in the figures may be exaggerated relative to other elements to help improve understanding of illustrated embodiments of the present disclosure.

DETAILED DESCRIPTION OF EXEMPLARY EMBODIMENTS

Reference will now be made to the drawings wherein like reference numerals identify similar structural features or aspects of the subject disclosure.

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of stated features.

The present disclosure relates to a cooled chemical cabinet used during the fabrication of semiconductor devices.

Referring to FIGS. 1-5, a system 100 may comprise a first cabinet 105 configured to enclose a reaction chamber 165, and a second cabinet 110 (i.e., a chemical cabinet) configured to contain a chemical. The second cabinet 110 may be connected to the first cabinet 105 with a gas line 115, wherein chemical from the second cabinet 110 is flowed to the first cabinet 105 and/or reaction chamber 165 via the gas line 115.

In various embodiments, the second cabinet 110 comprises a bottom panel, side panels (i.e., sidewalls), and a top panel, wherein the bottom panel, side panels, and top panel define an interior space 170 to contain or otherwise enclose various components. In an exemplary embodiment, the second cabinet 110 may be configured to maintain a negative pressure within the interior space 170.

In an exemplary embodiment, the second cabinet 110 is configured to house a vessel assembly 130 comprising a vessel clamp 200 and a vessel 205 configured to contain the chemical. In an exemplary embodiment, the chemical may be a liquid chemical, such as a pyrophoric chemical (e.g., Trimethylaluminium) that is cooled to a temperature in the range of 15 degrees Celsius to 120 degrees Celsius. In various embodiments, the vessel clamp 200 secures the vessel 205 within the second cabinet 110 and provides thermal distribution/regulation to the vessel 205 and the chemical. For example, an exterior sidewall of the vessel 205 may be in direct contact with an interior sidewall of the vessel clamp 200.

In an exemplary embodiment, the second cabinet 110 is configured to further house a cooling duct comprising an inlet air duct 120 and an outlet air duct 125 (i.e., an exhaust air duct). In various embodiments, the inlet air duct 120 and the outlet air duct 125 are connected such that air can flow into the inlet air duct 120 and out the outlet air duct 125. In various embodiments, the air flow may take any desired direction. For example, the outlet air duct 125 may be attached above the inlet air duct 120, such that the air flows upward (e.g., as illustrated in FIG. 1). Alternatively, the outlet air duct 125 may be attached below the inlet air duct 120, such that the air flows downward. Alternatively, the outlet air duct 125 may be attached to either side of the inlet air duct 120, such that the air flows sideways.

In various embodiments, the system 100 may further comprise a fan 135 disposed within the inlet air duct 120. The fan 135 may be configured to draw air into the inlet air duct 120, creating a positive pressure within the inlet air duct 120 when the fan 135 is in operation. The inlet air duct 120 may be at atmospheric pressure when the fan 135 is not in operation.

In various embodiments, the system 100 may further comprise a thermoelectric module (TEM) 150 to cool the vessel assembly 130 and chemical to a desired temperature. The TEM 150 may abut an exterior sidewall of the vessel assembly 130. For example, the TEM 150 may abut the vessel clamp 200. The TEM 150 may comprise a conventional TEM. For example, the TEM may comprise a first plate adjacent to the exterior sidewall of the vessel clamp 200 for cooling the vessel clamp 200 and vessel 205 and a second plate, in parallel with the first plate to collect heat. In an exemplary embodiment, TEM 150 may be disposed between the cooling duct and the vessel clamp 200.

In various embodiments, the system 100 may further comprise a heatsink 140 used to remove and release the heat from the second plate of the TEM 150. The heatsink 140 may be positioned between the cooling duct and the TEM 150. For example, the heatsink 140 may be attached to the inlet air duct 120 and may be positioned adjacent to the fan 135. In various embodiments, the fan 135 and the heatsink may be separated by a gap 160. The gap 160 may be any suitable distance to allow air to flow from the fan 135, across the heatsink 140, and out through the outlet air duct 125. For example, the gap 160 may be in the range of a half inch to 2 feet. In an exemplary embodiment, a first side of the heatsink 140 abuts the second plate of the TEM 150 and a second, opposite side of the heatsink 140 receives air directly from the fan 135.

In various embodiments, and referring to FIGS. 1 and 4A-B, the cooling duct may be located at or near a sidewall of the second cabinet 110. For example, the inlet air duct 120 may be positioned directly adjacent to a first opening 400 in the sidewall of the second cabinet 110, and the outlet air duct 125 may be positioned directly adjacent to a second opening 405 in the sidewall of the second cabinet 110. Furthermore, the outlet air duct 125 may be configured to direct the exhaust air to the exterior of the second cabinet 110, such that the exhaust air does not enter the interior space 170 of the second cabinet 110 or otherwise interfere with the operation of TEM 150.

In some cases, the TEM 150 may not operate efficiently if the heated exhaust air is expelled into the interior space 170 of the second cabinet 110. Therefore, to improve or otherwise maintain efficient operation of the TEM 150, the heated exhaust air is expelled outside of the second cabinet 100 and away from the TEM 150. In various embodiments, the air that is pulled into the inlet air duct 120 by the fan 135 and the heated exhaust air which flows through the outlet air duct 125 are isolated or otherwise contained within the cooling duct. According, air that flows through the cooling duct does not enter the interior space 170 of the second cabinet 110. This isolation prevents the TEM 150 from being affected by any heated exhaust air and allows the interior space 170 of the second cabinet 110 to remain at a negative pressure.

In various embodiments, and referring to FIGS. 1, 2, 3, and 5, the system 100 may further comprise an insulator 145 to insulate the TEM 150. In an exemplary embodiment, the insulator 145 may encircle the TEM 150 such that any areas of the TEM 150 that are not abutting the vessel assembly 130 or the heatsink 140, are in direct contact with the insulator 145. The insulator 145 may comprise any suitable insulating material and may be selected based on the particular temperature conditions inside the second cabinet 110, desired thermal control, and the like.

In various embodiments, and referring to FIGS. 2 and 6, the system 100 may further comprise a tray 210 disposed within the interior space 170 of the second cabinet 110. The tray 210 may be configured to trap any chemical that may leak from the vessel 205. In an exemplary embodiment, the tray 210 may be positioned below the vessel assembly 130 and the cooling duct. The tray 210 may rest on the bottom panel of the second cabinet 110.

In various embodiments, the system 100 may further comprise a sensor 600 to detect liquids, such as liquid chemicals that have leaked out of the vessel 205. In an exemplary embodiment, the sensor 600 is located within the tray 210 and positioned below the vessel assembly 130. The sensor 600 may comprise any sensor suitable for detecting liquids and that which can withstand the temperature and pressure conditions within the interior space 170 of the second cabinet 110 (FIG. 1).

In various embodiments, the system 100 may further comprise a shield (not shown) attached to the outer sidewall of the second cabinet 110 below the second opening 405 to deflect exhaust air in an upwards direction or otherwise away from the first opening 400 and/or the inlet air duct 120.

In operation, the TEM 150 operates to cool the vessel assembly 130 according to the Peltier effect. The heatsink 140 is used to facilitate further heat dissipation from the TEM 150. In addition, the fan 135 pulls air into the inlet air duct 120 so that the air flows across the heatsink 140 to facilitate heat dissipation. The air that reaches the heatsink absorbs the heat from heatsink and the heated air is then expelled outside of the second cabinet 110 by the exhaust duct 125. Air within the cooling duct is isolated from the air in the interior space 170 of the second cabinet 110.

Although this disclosure has been provided in the context of certain embodiments and examples, it will be understood by those skilled in the art that the disclosure extends beyond the specifically described embodiments to other alternative embodiments and/or uses of the embodiments and obvious modifications and equivalents thereof. In addition, while several variations of the embodiments of the disclosure have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure should not be limited by the particular embodiments described above.

What is claimed is:

1. An apparatus comprising:
- a cabinet comprising a bottom plate, a top plate, and a plurality of sidewalls including at least a first sidewall, wherein the plurality of sidewalls, the bottom plate, and the top plate define an interior space of the cabinet;
- a vessel assembly positioned within the interior space and comprising a vessel configured to contain a chemical;
- a thermoelectric module positioned within the interior space abutting and in physical contact with the vessel assembly;
- a heatsink abutting the thermoelectric module; and
- a cooling duct positioned within the first sidewall, fluidically isolated from the interior space and adjacent to the heatsink.

2. The apparatus according to claim 1, wherein the first sidewall comprises a first opening and the cooling duct comprises an inlet air duct positioned at the first opening in the first sidewall and a fan located within the inlet air duct, wherein the fan is configured to pull air toward the heatsink via the inlet air duct.

3. The apparatus according to claim 2, wherein the cooling duct further comprises an exhaust duct connected to the inlet air duct and positioned adjacent to the fan and the heatsink.

4. The apparatus according to claim 3, wherein the exhaust duct is shaped to exhaust air in the exhaust duct to outside the cabinet.

5. The apparatus according to claim 3, wherein the first sidewall comprises a second opening and the exhaust duct is positioned above the inlet air duct and the fan, and is configured to exhaust air through the second opening.

6. The apparatus according to claim 2, wherein the fan is adjacent to the heatsink.

7. The apparatus according to claim 3, wherein the first sidewall comprises a second opening and the exhaust duct is positioned below the inlet air duct and the fan, and is configured to exhaust air through the second opening.

8. The apparatus according to claim 1, wherein the thermoelectric module comprises:
- a first plate abutting and in physical contact with the vessel assembly; and
- a second plate parallel to the first plate, wherein the second plate abuts the heatsink.

9. The apparatus according to claim 8, further comprising an insulator surrounding the thermoelectric module.

10. The apparatus according to claim 1, further comprising a liquid sensor positioned on the bottom plate and within the interior space.

11. The apparatus according to claim 1, wherein the vessel assembly further comprises a vessel clamp configured to secure the vessel within the cabinet, wherein the thermoelectric module abuts the vessel clamp.

12. The apparatus according to claim 1, wherein the cooling duct is in open communication with the atmosphere.

13. An apparatus comprising:
- a cabinet comprising a bottom plate, a top plate, and a plurality of sidewalls including at least a first sidewall including a first opening, wherein the plurality of sidewalls, the bottom plate, and the top plate define an interior space of the cabinet;
- a vessel assembly positioned within the interior space and comprising a vessel configured to contain a chemical;
- a thermoelectric module positioned within the interior space and comprising a first plate and a second plate, wherein the first plate is abutting and in physical contact with the vessel assembly and the second plate is parallel to the first plate;
- a heatsink in direct contact with the second plate; and
- a cooling duct comprising:
  - an inlet air duct positioned at the first opening;
  - a fan located within the inlet air duct and positioned adjacent to and spaced apart from the heatsink; and
  - an exhaust duct connected to the inlet air duct and positioned adjacent to the fan and the heatsink,
  - wherein the cooling duct is fluidly isolated from the interior space of the cabinet.

14. The apparatus according to claim 13, wherein the exhaust duct is shaped to exhaust air in the exhaust duct to outside the cabinet.

15. The apparatus according to claim 13, wherein the fan is configured to pull air toward the heatsink via the inlet air duct.

16. The apparatus according to claim 13, wherein the first sidewall comprises a second opening and the exhaust duct is positioned above the inlet air duct and the fan, and configured to exhaust air through the second opening.

17. A system comprising:
- the apparatus of claim 1; and
- a reaction chamber; and
- wherein the apparatus is coupled to the reaction chamber and is configured to deliver a chemical to the reaction chamber.

18. The system according to claim 17, wherein the vessel assembly further comprises a vessel clamp configured to secure the vessel within the cabinet, and wherein the thermoelectric module abuts the vessel clamp.

19. The system according to claim 17, wherein the cooling duct comprises a fan and an inlet air duct, wherein the fan is configured to pull air toward the heatsink via the inlet air duct.

20. The system according to claim 19, wherein the first sidewall comprises a first opening and the cooling duct further comprises an exhaust duct positioned above the inlet air duct and the fan, wherein the exhaust duct is configured to exhaust air in the exhaust duct to outside the cabinet through the first opening.

* * * * *